Figure 1:
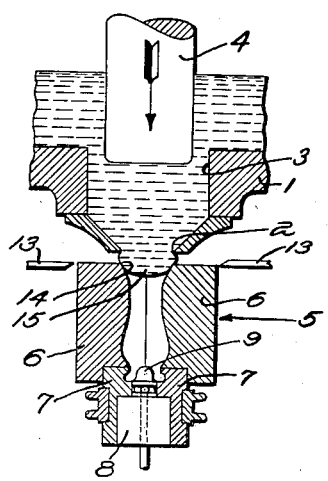
Figure 2:
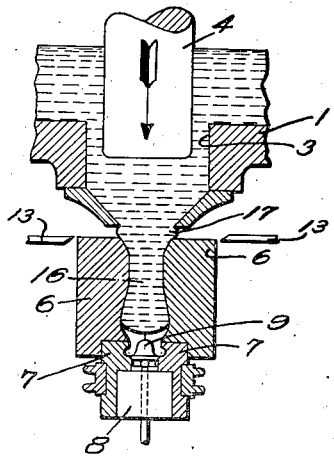
Figure 3:
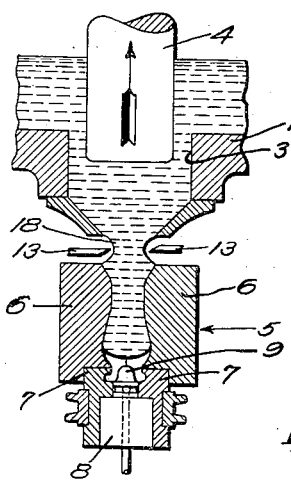

March 21, 1933.  G. E. ROWE  1,902,141

MANUFACTURE OF HOLLOW GLASSWARE

Filed Sept. 30, 1929

Inventor
George E. Rowe
By Brown & Parham
Attorneys

Patented Mar. 21, 1933

1,902,141

UNITED STATES PATENT OFFICE

GEORGE E. ROWE, OF WEST HARTFORD, CONNECTICUT, ASSIGNOR TO HARTFORD-EMPIRE COMPANY, OF HARTFORD, CONNECTICUT, A CORPORATION OF DELAWARE

MANUFACTURE OF HOLLOW GLASSWARE

Application filed September 30, 1929. Serial No. 396,243.

My invention relates generally to the manufacture of hollow glassware and more particularly to the manufacture of such glassware from glass that is discharged from a submerged outlet of a glass container directly into a parison mold that is located below and in alignment with the discharge outlet.

In my copending application, Serial No. 396,242, filed Sept. 30, 1929, I have disclosed and claimed improved apparatus and method for producing hollow glassware by steps which involve the filling of the underlying parison mold to its full capacity while preventing any laps or folds in the glass charge within the mold and in such manner as to obtain a smooth, external surface on the glass, a skin formation of uniform and relatively slight thickness and symmetrical viscosity and condition of the glass throughout the length of the blank or parison.

The present invention, as distinguished from that which is disclosed in the aforesaid companion application, contemplates the loading of the parison mold below the glass outlet so as to produce a glass charge which will have the desirable features and characteristics of a "full" glass charge in the parison mold and will have additional advantages arising from the fact that a cavity is produced in the upper portion thereof as a step in the loading of the parison mold.

An object of the present invention is the provision in the manufacture of blown glassware of a parison having an internal cavity produced in such manner and so located in the parison that the glass at the center of the parison may be forced longitudinally thereof to produce a bubble in the parison without sliding any portion of the glass parison in contact with the walls of its confining mold and without material elongation, stretching or alteration of the skin or surface portion of the parison.

A further object of the present invention is to improve the method of filling a parison mold with glass from a discharge outlet so that the glass within the filled parison mold will have a smooth outer surface, a skin formation of uniform and relatively slight thickness and a substantially uniform viscosity and condition throughout its length and at the same time will have an axial cavity at the end thereof opposite to the neck portion of the mold, thereby permitting preliminary blowing or partial expansion of the glass parison in the parison mold without causing longitudinal movement of any outer portion of the glass charge or the parison in sliding contact with the mold walls and without causing non-uniform chilling of different portions of the surface of the glass charge.

Other objects and advantages of the invention will be apparent from the following description, when it is considered in conjunction with the accompanying drawing.

Figure 4:
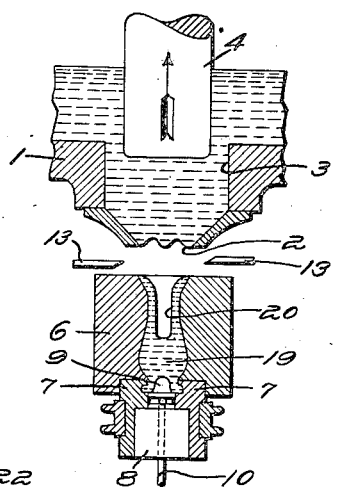
Figure 5:
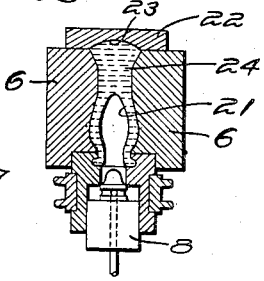
Figure 6:
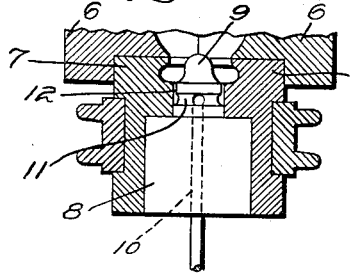

In the drawing, Figs. 1 to 5 inclusive, are more or less diagrammatic fragmentary vertical sectional views of such apparatus of a practical embodiment of the invention as requires illustration in order to afford an understanding of one method of performing the present invention, the respective views showing various stages in the manufacture of a glass parison from glass discharged downwardly through an outlet of the glass container into an underlying parison mold; and Fig. 6 is an enlarged fragmentary vertical sectional view of a portion of the parison mold, showing particularly the means for causing a partial vacuum within the neck finish portion of the mold when the neck finish plunger of the mold is raised.

In the drawing, a furnace forehearth or extension or other container for a supply body of molten glass is partially indicated at 1. This container is provided with a discharge outlet 2 in its base, such outlet preferably being located at the lower end of a well 3 and having a diameter substantially less than that of the major portion or body of the well. A discharge regulating implement 4 depends in the glass in the container, preferably into the well 3, and is reciprocable vertically with a stroke which may be selected to produce desirable acceleration of discharge of glass through the outlet for a predetermined appropriate portion of the loading cycle and retardation of flow or retraction of glass in and below the outlet for another part of the load ally at 5, preferably has a body portion comprising a pair of partible sections 6 and a neck portion comprising a pair of partible sections 7. A neck finish plunger 8 is slidable vertically within limits in the neck ring portion of the parison mold and has its tip 9 protruding into the neck finish portion of the mold cavity when the neck finish plunger is raised, as shown in Figs. 1 to 4, inclusive, and Fig. 6. As shown more clearly in Fig. 6, the neck finish plunger has a central bore 10 communicating at its upper end with an annular groove 11 which in turn communicates through an annular space 12 between a portion of the neck finish plunger and the wall of the neck ring with the neck finish portion of the cavity of the parison mold. The bore 10 may be connected in any suitable manner with suitable means, not shown, for supplying sub-atmospheric and super-atmospheric pressures selectively to the cavity of the parison mold.

The parison mold may be supported by any suitable supporting and operating mechanism so as to be brought at the proper time to a position in line with the discharge outlet and so that the parison mold may be vertically moved in line with the outlet for a purpose to be presently described. No mechanism for this purpose is illustrated because mechanism suitable therefor may be produced by those skilled in the art whenever required.

Cooperative shear blades 13 are provided for severing the connecting glass between the parison mold and the glass in the outlet at the proper time and at a predetermined level. Operating and supporting mechansm for the shear blades is not illustrated because the art contains disclosures of various mechanisms suitable for this purpose.

The configuration of the cavity of the parison mold may vary according to particular requirements and according to the shape of the parison desired. The extreme upper end portion of such cavity preferably is upwardly flaring or tapering, as indicated at 14, so that the extreme upper edge thereof and the discharge outlet 2 have substantially the same diameter.

In using the apparatus above described in the performance of the present invention and to produce the novel and improved parison of the present invention, the parison mold is brought to a position in line with the discharge outlet and preferably spaced below the latter, substantially as shown in Fig. 1, although it may be raised nearer to or even against the outlet. The implement 4 is moving downward in Fig. 1 and the lower end of the descending column of glass 15 is shown as having moved into contact with the flaring upper portion 14 of the cavity of the parison mold and as having sealed the upper end of such cavity. The continued downward movement of the implement 4 will accelerate the discharge of glass through the outlet 2 and the contact of the lower end portion of the column 15 with the walls of the upper end portion of the cavity of the parison mold will prevent the outer portion of such glass column from sliding downward along the walls of the upper part of the mold cavity. With this condition, the partial filling of the mold cavity will be effected by the downward movement of the relatively hot glass at the center of the glass column. It is believed from observation of the results of practical tests, that the pressure from above on the relatively hot glass at the center of the column in the downwardly tapering upper part of the mold cavity will cause the filling of the lower part of the mold cavity to be effected progressively, as past the stage illustrated by Fig. 2. Hot glass from the center of the column will be forced under pressure in a generally downwardly direction but is believed to produce a mass which, as formed, will extend laterally into contact with the side walls of the mold cavity, even when such mold cavity enlarges somewhat in diameter for part of its length, as shown. Probably the cohesive attraction between the particles of the glass aids in effecting this result. In any event, each portion of the glass in the mold cavity that contacts with a wall thereof, will, on contacting with such wall, become chilled and remain in non-sliding contact therewith. A column of connecting glass having a diameter at least as great as that of the outlet will be maintained between the glass in the parison mold and the glass in the outlet. When this filling of the cavity of the parison mold has progressed to such an extent that the downward movement of glass above the mold is relatively greater than the rate of change of level of the lower end of the glass in the mold cavity and the mold is spaced below the outlet as shown, the connecting glass will be slightly enlarged in diameter as at the plane indicated at 17, in Fig. 2

The loading of the cavity of the mold may be continued in this manner and augmented by the application of suction during the filling of the neck finish portion of such cavity while the parison mold is in its raised position until such parison mold has been completely filled, as disclosed and claimed in my aforesaid companion application.

However, I have discovered that a novel and useful parison may be produced by suitably timing and controlling the reciprocatory movements of the discharge regulating implement 4, the downward movement of the parison mold, the closing of the shears, and the application of sub-atmospheric pressure within the neck finish portion of the parison mold with respect to one another so that the resultant separated charge of glass within the parison mold will have a cavity in its upper portion and will have a uniformly chilled surface portion extending the full length of the parison mold. To this end, the parison mold is moved downward and the upward or retractive stroke of the glass discharge regulating implement 4 is commenced before the lower reduced or neck finish portion of the parison mold has been filled with glass. Fig. 4 illustrates the connecting glass between the glass in the mold and the glass in the outlet attenuated or stretched as indicated at 18 by the downward movement of the parison mold 5 and the retractive action of the upwardly moving discharge regulating implement 4. The shear blades 13 are closing to sever the attenuated connecting portion of glass and the lower or neck finish portion of the cavity within the mold remains unfilled. Suction to a predetermined regulable extent is now caused in the neck finish portion of the cavity of the parison mold, being commenced at a regulable selected time shortly before, at, or immediately after the closing of the shears. This suction will aid in drawing glass downwardly from the center of the column to fill the neck finish portion of the mold cavity without causing sliding movement of the surface or outer portion of such glass on the wall of the mold cavity.

Glass will fill the lower or neck finish portion of the mold cavity and will extend for the full length of the mold cavity, as indicated at 19 in Fig. 4, an axial cavity 20 being provided in the upper portion of such glass. Thus, the resultant charge will have all the advantages of a charge that would completely fill the cavity of the parison mold and possesses additional advantages in that it may be partially blown or preliminarily expanded in the parison mold. Fig. 4 shows the shears after they have opened. The glass stub above the shears has been retracted by the action of the upwardly moving implement 4 into the heated environment of the outlet 2, such glass stud preferably being maintained for a substantial length of time at a plane not below the level of the outlet 2. The severed end of the glass below the shears comprises glass that is located mainly at the relatively hot central portion of the glass column, which central portion sags and is drawn downwardly to fill the neck finish portion of the mold and to form the cavity indicated at 20.

The extent of this cavity 20 may be varied by varying the size of the unfilled portion of the mold cavity at the time of shearing. This may be done by varying the time at which the suction is caused within the lower part of the parison mold with respect to the time of the shearing operation, or by varying the intensity of the suction within the lower part of the mold cavity and by any combination of these factors. Since the walls of the cavity 20 are located within the body of the glass in the parison mold, the relatively hot central portion of the glass charge may be displaced longitudinally of the parison mold so as to produce the bubble indicated at 21 in Fig. 5 in lieu of the glass cavity 20 of Fig. 4 without disturbing the surface of such charge. To effect this desirable result, a closure plate 22 may be disposed on the body section of the parison mold and may have a cavity 23 adapted to supplement the body portion of the parison mold. The plunger 8 then is lowered and pressure is applied through the neck plunger to the neck finish portion of the glass within the parison mold, thereby displacing glass at the interior of the charge upwardly against the closure plate 22 to produce the parison indicated at 24 in Fig. 5, which parison has the aforesaid bubble 21. The size of the bubble 21 may be predetermined by appropriate selection of the size of the cavity 20, supplemented of course by appropriate control and selection of the pressure for the partial expansion or blowing of the parison. If desired, the glass parison 19 with the cavity 20 therein may be transferred to a separate parison mold for the blowing of the bubble 21 and the partial expansion of the parison.

After the formation of the parison 24, as shown in Fig. 5, the remaining steps of forming a finished article of glassware may be performed by any suitable apparatus and in any suitable known manner. Such additional steps may involve transfer of the parison to the finishing mold and the final blowing of the finished article therein or the parison mold may be suitably formed and the amount of glass placed therein may be suitably selected so that the finished article may be formed in the same mold, into which the glass from the outlet is discharged.

The various features of the invention may be modified as to character, combination and arrangement to adapt the invention to different uses or different conditions of service without departing from the spirit and scope of the invention as set out in the appended claims.

I claim:

1. The method of loading a preliminary shaping charge receiver having an elongate cavity, comprising the steps of disposing said charge receiver below and in adjacent relation with a downwardly opening discharge outlet of a container for molten glass so that the cavity of the charge receiver is in alignment with said outlet, the size of the outlet and of the upper end of the cavity of the charge receiver being selected with relation to each other so that the lower end of a column of glass descending from the outlet will seal the upper end of said cavity on contact with the walls thereof, forcing glass from the interior of said column downwardly into the cavity of the charge receiver while the surface glass in contact with walls of said cavity is restrained against downward movement, applying suction within the lower end portion of the cavity after said cavity has been filled from its upper end nearly to its lower end, attenuating the glass between the charge receiver and the outlet and severing the attenuated glass while said suction is maintained and before the lower portion of the cavity has been completely filled, whereby a central cavity will be produced in the upper part of the glass charge in the charge receiver when the lower end portion of the latter has been filled with glass.

2. In the manufacture of articles of hollow glassware, the method of forming parisons which comprises, for each parison, disposing a parison mold below and in adjacent relation with a downwardly opening discharge outlet of a container for molten glass so that the cavity of the parison mold is in alignment with said outlet, the size of the outlet and of the upper end of the cavity of the parison mold being selected with relation to each other so that the lower end of a column of glass from the outlet will seal the upper end of said cavity on contact with the walls thereof, forcing glass from the interior of said column downwardly into the cavity of the parison mold while the surface glass in contact with the walls of said cavity is restrained against downward movement, applying suction within the lower end portion of the cavity of the parison mold after said cavity has been filled from its upper end nearly to its lower end, attenuating the glass between the parison mold and the outlet and severing the attenuated glass while such suction is maintained and before the lower portion of the cavity of the parison mold has been completely filled, to produce a central cavity in the upper part of the glass in the mold when the lower end portion of the cavity of the mold is completely filled with glass, and varying the size of the cavity in the parisons by varying the ratio at the time of severance of the unfilled lower end portion to the filled portion of the cavity of the mold.

3. In the manufacture of articles of hollow glassware, the method of forming parisons which comprises, for each parison, disposing a parison mold below and in adjacent relation with a downwardly opening discharge outlet of a container for molten glass so that the cavity of the parison mold is in alignment with said outlet, the size of the outlet and of the upper end of the cavity of the parison mold being selected with relation to each other so that the lower end of a column of glass from the outlet will seal the upper end of said cavity and contact with the walls thereof, forcing glass from the interior of said column downwardly into the cavity of the parison mold while the surface glass in contact with the walls of said cavity is restrained against downward movement, applying suction within the lower end portion of the cavity of the parison mold after said cavity has been filled from its upper end nearly to its lower end, attenuating the glass between the parison mold and the outlet and severing the attenuated glass while such suction is maintained and before the lower portion of the cavity of the parison mold has been completely filled to produce a central cavity in the upper part of the glass in the mold when the lower end portion of the cavity of the mold is completely filled with glass, and varying the size of the cavity in the parisons by varying the time of application of the suction in the lower part of the mold with respect to the time of severance.

4. In the manufacture of articles of hollow glassware, the method of forming parisons which comprises, for each parison, disposing a parison mold below and in adjacent relation with a downwardly opening discharge outlet of a container for molten glass so that the cavity of the parison mold is in alignment with said outlet, the size of the outlet and of the upper end of the cavity of the parison mold being selected with relation to each other so that the lower end of a column of glass from the outlet will seal the upper end of said cavity and contact with the walls thereof, forcing glass from the interior of said column downwardly into the cavity of the parison mold while the surface glass in contact with the walls of said cavity is restrained against downward movement, applying suction within the lower end portion of the cavity of the parison mold after said cavity has been filled from its upper end nearly to its lower end, attenuating the glass between the parison mold and the outlet and severing the attenuated glass while such suction is maintained and before the lower portion of the cavity of the parison mold has been completely filled to produce a central cavity in the upper part of the glass in the mold when the lower end portion of the cavity of the mold is completely filled with glass, and varying the size of the cavity in the parisons by varying the amount of suction on the glass prior to the severance of the glass in the mold from the source of supply.

5. In the manufacture of articles of hollow glassware, the method of forming parisons which comprises, for each parison, disposing a parison mold below and in adjacent relation with a downwardly opening discharge outlet of a container for molten glass so that the cavity of the parison mold is in alignment with said outlet, the size of the outlet and of the upper end of the cavity of the parison mold being selected with relation to each other so that the lower end of a column of glass from the outlet will seal the upper end of said cavity and contact with the walls thereof, forcing glass from the interior of said column downwardly into the cavity of the parison mold while the surface glass in contact with the walls of said cavity is restrained against downward movement, applying suction within the lower end portion of the cavity of the parison mold after said cavity has been filled from its upper end nearly to its lower end, attenuating the glass between the parison mold and the outlet and severing the attenuated glass while such suction is maintained and before the lower portion of the cavity of the parison mold has been completely filled to produce a central cavity in the upper part of the glass in the mold when the lower end portion of the cavity of the mold is completely filled with glass, and varying the size of the cavity in the parisons by changing the timed relation between the application of the suction and the time of severance of the glass.

6. In the manufacture of articles of hollow glassware, the method which comprises disposing a parison mold in alignment with a downwardly opening outlet in the bottom of a container for molten glass so that the parison mold is adjacent to said outlet, the size of said outlet and of the upper end of the cavity of said parison mold being selected with respect to each other so that a column of glass from the outlet will seal the upper end of the cavity mold on contact with the walls thereof, forcing glass downwardly through the interior of said column into the cavity of the parison mold while the surface glass of said column in contact with the walls of the cavity mold is restrained against downward movement, applying suction to the lower end of the glass in the mold before the lower end of the mold cavity has been filled with glass, attenuating the glass between the mold and the outlet and severing the attenuated glass before the complete filling of the lower end of the mold cavity has been accomplished and while suction is maintained in such lower end portion of the mold to produce a cavity in the upper portion of the glass in the mold when the lower end portion of such cavity is filled with glass, then closing the upper end of the parison mold, discontinuing the suction within the lower part of the mold, and applying a positive pressure centrally of the lower portion of the glass in the mold to force the central portion of the glass of the mold upwardly so as to eliminate the cavity in the upper portion of such glass and to produce a bubble in the lower portion of the glass in the mold.

7. The method of loading a charge receiver having a neck finish portion at its lower end, which comprises forcing glass through the interior of a column of molten glass downwardly into the cavity of the charge receiver while restraining downward sliding movement of the surface glass in contact with walls of the cavity of the charge receiver, applying suction to the lower end of the glass in the cavity of the charge receiver before such glass reaches the lower end of said cavity, and severing the glass in the charge receiver from the supply column above the charge receiver before the lower portion of the glass thus severed has completely filled the lower end portion of the cavity in the charge receiver and while said suction on the glass is maintained, whereby the severed glass in the charge receiver will extend the full length of the cavity of said charge receiver when the lower end portion of the latter has been completely filled and will have a central cavity in its upper portion.

8. The method of loading a charge receiver having a neck finish portion at its lower end, which comprises forcing glass through the interior of a column of molten glass downwardly into the cavity of the charge receiver while restraining downward sliding movement of the surface in contact with walls of the cavity of the charge receiver, applying suction to the lower end of the glass in the cavity of the charge receiver before such glass reaches the lower end of said cavity, and severing the glass in the charge receiver from the supply column above the charge receiver at the instant of application of said suction and before the lower portion of the glass thus severed as completely filled the lower end portion of the cavity in the charge receiver, whereby the severed glass in the charge receiver will extend the full length of the cavity of said charge receiver when the lower end portion of the latter has been completely filled and will have a central cavity in its upper portion.

9. The method of loading a charge receiver having a neck finish portion at its lower end, which comprises forcing glass through the interior of a column of molten glass downwardly into the cavity of the charge receiver while restraining downward sliding movement of the surface glass in contact with walls of the cavity of the charge receiver, applying suction to the lower end of the glass in the cavity of the charge receiver before such glass reaches the lower end of said cavity, and severing the glass in the charge receiver from the supply column above the charge receiver immediately before the application of said suction and before the lower portion of the glass thus severed has completely filled the lower end portion of the cavity in the charge receiver, whereby the severed glass in the charge receiver will extend the full length of the cavity of said charge receiver when the lower end portion of the latter has been completely filled and will have a central cavity in its upper portion.

10. The method of loading a charge receiver having an elongate glass receiving cavity, comprising the steps of disposing said charge receiver below and in adjacent relation with the lower end of a downwardly opening outlet in the bottom of the container for molten glass, the size of the outlet and of the upper end of the cavity of the charge receiver being such with relation to each other that a column of glass from the outlet will seal the upper end of such cavity on contact with the walls thereof, forcing glass downwardly through the interior of said column into the charge receiver at a rate accelerated beyond that which would be caused by gravity and head pressure, attenuating the glass between the charge receiver and the outlet before the glass in the cavity of the charge receiver has reached the lower end of the latter by moving said charge receiver downwardly with the glass therein and simultaneously applying a retractive impulse to the glass adjacent to the outlet, and severing the attenuated glass before the lower portion of the glass in the charge receiver has completely filled the lower end portion of the cavity of said charge receiver, whereby a central cavity will be produced in the upper portion of the glass in the charge receiver when the lower portion of the cavity of said charge receiver has been completely filled with glass.

11. The method of loading a charge receiver having an elongate glass receiving cavity, comprising the steps of disposing said charge receiver below and in adjacent relation with the lower end of a downwardly opening outlet in the bottom of a container for molten glass, the size of the outlet and of the upper end of the cavity of the charge receiver being such with relation to each other that a column of glass from the outlet will seal the upper end of such cavity on contact with the walls thereof, forcing glass downwardly through the interior of said column into the charge receiver at a rate accelerated beyond that which would be caused by gravity and head pressure, attenuating the glass between the charge receiver and the outlet before the glass in the cavity of the charge receiver has reached the lower end of the latter by moving said charge receiver downwardly with the glass therein and simultaneously applying a retractive impulse to the glass adjacent to the outlet, and severing the attenuated glass before the lower portion of the glass in the charge receiver has completely filled the lower portion of the cavity of said charge receiver, whereby a central cavity will be produced in the upper portion of the glass in the charge receiver when the lower portion of the cavity of said charge receiver has been completely filled with glass, and applying suction to the lower portion of the glass in the cavity of the charge receiver at a time regulable with respect to the time of severance of the attenuated glass to aid in effecting complete filling of the lower end portion of the cavity of the charge receiver and in controlling the size of the central cavity in the upward portion of the glass in the charge receiver.

12. The method of forming an article of blown glassware, comprising forcing glass from the interior of a column of molten glass downwardly into the interior of an inverted mold while restraining downward sliding movement of the glass in contact with walls of the mold cavity, severing the glass in the mold from the supply column before the lower end of such glass reaches the bottom of the cavity of the inverted mold, applying suction to the lower part of the mold cavity at a time selected with respect to the time of severance to cause a central cavity to be formed in the upper portion of the glass in the mold when the lower part of such mold cavity has been filled with glass, closing the upper end of the mold, and introducing blowing pressure into the glass at the opposite end of the mold to expand the glass in the mold into the finally blown article.

13. The method of charging a mold which comprises introducing into an open end of the mold cavity a supply column of molten glass of sufficient size to seal said end of the mold cavity, severing glass for the mold charge from said supply column before the mold cavity has been completely filled with glass but after glass for a substantial part of said charge has entered the mold, and controlling the movement of the glass in said cavity to produce non-sliding contact between the glass and the walls of the mold cavity throughout the area of said walls.

14. The method of charging a mold which comprises introducing an end portion of a supply column of molten glass into the cavity of the mold, severing glass for the charge from said supply column before sufficient glass to completely fill the mold cavity has passed the plane of severance into the mold, and controlling the distribution in the mold cavity of the severed glass to provide non-sliding contact of such glass with the walls of the mold cavity throughout the area of the latter and to produce an axial cavity in the glass in the mold.

15. In a manufacture of hollow glassware, the method which comprises charging a mold having a neck forming end portion with molten glass from a source of supply so that said neck forming end portion of the mold cavity is remote from the source of supply and is temporarily unfilled, causing differential pressures on the opposite ends of glass in the mold so that the greater of said pressures is effective at the end opposite the neck forming portion thereof to displace the more fluid central portion of said glass sufficiently to fill said previously unfilled neck forming end portion of the mold cavity and to produce an axial cavity in the glass in the opposite end of said mold, and causing a return longitudinal movement of a central portion of the glass while in said mold to displace outwardly the walls of said axial cavity and to produce a hollow parison.

16. In the manufacture of hollow glassware, the method which comprises charging a mold with molten glass from a source of supply so that the mold cavity is filled progressively from one end thereof toward its opposite end and the glass in the mold is severed from the source of supply while the end portion of the mold cavity remote from said source of supply is still unfilled, causing a suction in said unfilled end portion of the mold cavity to draw thereinto relatively hot and fluid glass from the central portion of the glass in the mold to fill said previously unfilled end portion of the mold cavity while the surface portion of the glass charge in the mold remains in non-sliding contact with the walls of the mold cavity and thus to provide an axial cavity in the glass at the first filled end thereof, and introducing blowing pressure into the glass in the last filled end portion of the mold cavity to cause a return longitudinal movement of an internal portion of the glass to blow out the walls of said axial cavity and to produce a partially expanded hollow parison having a closed bottom portion.

17. In the manufacture of hollow glassware, the method which comprises charging a mold having a neck-forming portion at one end thereof with molten glass so that the neck-forming portion of the mold cavity is temporarily unfilled, causing a suction in the neck-forming portion of the mold cavity to draw glass from the central portion of the charge into the space around a neck pin in said neck-forming portion of the mold and to provide an axial cavity in the glass at the opposite end of the mold, withdrawing the neck pin to leave an initial blow aperture in the glass in said neck-forming portion of the mold, and introducing blowing pressure through said initial blow aperture to displace an internal portion of the glass in the mold longitudinally thereof so as to blow out the walls of the aforesaid axial cavity and to produce a hollow parison having a bottom portion.

18. In the manufacture of an article of hollow glassware by the use of apparatus including a parison mold having an end portion for forming the neck of the article to be made, and a removable pin projecting into said neck forming portion of the mold in spaced relation with the walls thereof, the method which comprises charging the parison mold through the end opposite the neck forming portion thereof with molten glass of insufficient mass to completely fill the cavity of said mold, causing the glass in the mold to be so disposed therein as to fill the space around the neck pin in the neck forming portion of the mold and to contact with the walls of the remainder of the mold cavity throughout substantially the entire area thereof, leaving an axial cavity in the glass at the end of the latter opposite the neck pin, withdrawing the neck pin, and introducing blowing pressure into the space left in the glass by the withdrawal of the neck pin while the axial cavity at the end opposite the neck pin persists to displace an internal portion of the glass in the mold cavity as required to blow out the walls of said axial cavity and to provide a bubble of the desired size in the glass in the mold.

Signed at Hartford, Connecticut, this 27th day of September 1929.

GEORGE E. ROWE.